Oct. 31, 1967  H. K. LOTZ ETAL  3,350,079
CUTTING CYCLE FOR FLAME CUTTING OF BILLETS
Filed July 13, 1964
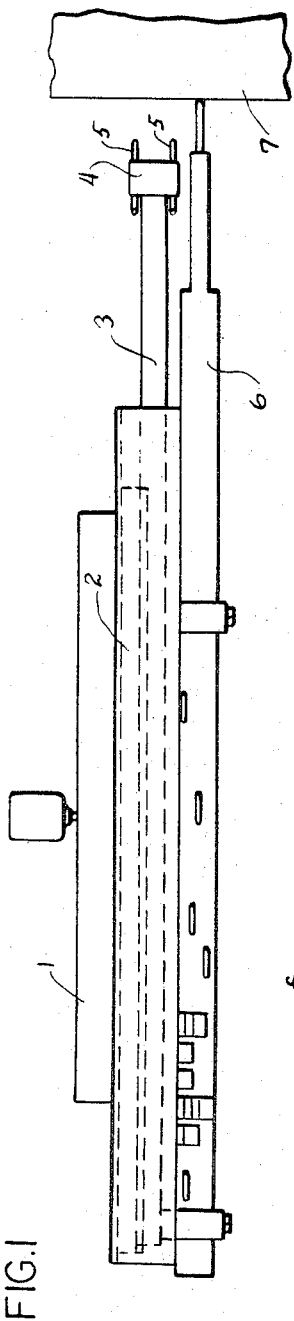
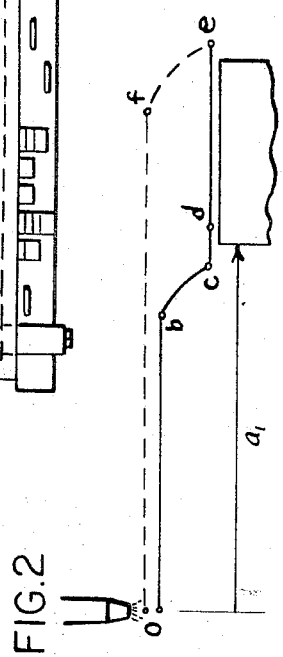
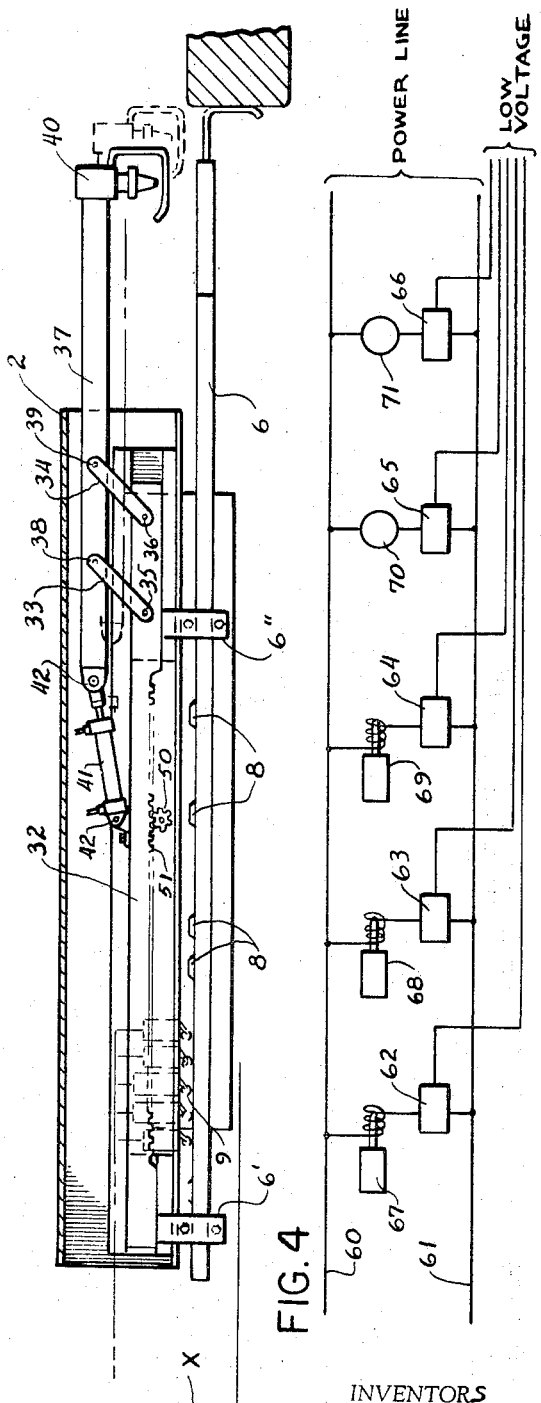
INVENTORS
HORST K. LOTZ
ALFRED PFEUFFER
BY
ATTORNEYS United States Patent Office 3,350,079
Patented Oct. 31, 1967

3,350,079
CUTTING CYCLE FOR FLAME
CUTTING OF BILLETS
Horst K. Lotz, Frankfurt am Main, and Alfred Pfeuffer, Neu-Isenburg, Germany, assignors, by mesne assignments, to Messer Griesheim G.m.b.H., Frankfurt am Main, Germany, a corporation of Germany
Filed July 13, 1964, Ser. No. 382,264
3 Claims. (Cl. 266—23)

This invention is concerned with a device for setting and controlling the cutting cycle for flame cutting of billets. Billets leaving a steel mill rolling mill normally are cut by one or several cutting torches travelling parallel in relation to each other and transverse in relation to the billet. However, as the billets are not straightened on their carriages and do not always leave the rolling mill on the same centerline, the starting points of the cuts are not always the same distance from the cutting machine. Consequently, the paths of travel of the individual torches to the starting points are of different lengths. Furthermore, to achieve the minimum cutting cycle times, the torches approach the starting point at a speed higher than the cutting speed, necessitating a change of the speed of the torch drive as soon as the starting point of the cut is reached. This change of speed as well as the operation of the fuel gas and cutting oxygen valves must be effected individually and by hand so that each torch requires one operator.

In the past, it has been suggested that a roller travelling ahead of or alongside the torch be provided. When rolling onto the billet, this roller would change the drive to cutting speed via switches and relays. Upon completion of the extent of torch movement, the driving direction of the torch is reversed by means of a limit switch so that the torch returns to its starting position. This device works satisfactorily only if the deviations of the billet axis from a straight line are in a horizontal plane. Only then is it possible for the travelling roller of the feeler to roll onto the billet. However, if there are also considerable deviations of the billet axis from a straight line in the vertical plane, the travelling roller of the height feeler will stop at the billet edge instead of rolling onto the billet. In that case, the torch and its guide must be lifted onto the billet by an operator.

This problem is eliminated by the subject invention. Instead of controlling the torch speed by means of the work piece, this invention uses an automatic cutting cycle control device which automatically adjusts to any position of the billet cross section through which the flame cut is to be made. The program is set in accordance with the billet dimensions and comprises the following torch operations:

(1) Rapid approach of the torch to the work piece until a feeler rod touches the side of the billet.
(2) Lowering of the torches to a pre-selected distance from the billet surface.
(3) Starting the cut at slow forward motion of the torch.
(4) Flame cutting at a working speed according to the thickness of the billet.
(5) Lifting the torch upon completion of the cut and rapidly returning the torch and feeler rod to the starting position.

Thus, the invention consists of a flame cutting device for transverse cutting of rolled billets with one or more separately driven torches travelling parallel in relation to each other and transverse in relation to the billet. The torch speed is automatically changed to various rates of speed in accordance with a pre-selected program. The invention is characterized by the following features: Each torch is located at the end of a vertically movable arm. The arm, in turn, is mounted on a longitudinally guided and driven slide and carries a feeler rod which may move in relation to the slide. The relative movement between feeler rod and slide controls the cutting program. When the feeler rod touches the billet, the relative motion begins and the slide, continuing to travel, scans the program set on the feeler rod and controls the drive as well as fuel gas and cutting oxygen valves in accordance with a predetermined program. In order to insure the correct distance between torch and billet surface, an adjustable skid is attached to the front end of the arm. This device may also be used for slag scarfing and for transverse cutting of continuous strands. The attached drawing shows the following:

FIGURE 1 is a simplified illustration of a device according to the subject invention.

FIGURE 2 is the movement of the torch nozzle in relation to the billet during the work cycle.

FIGURE 3 is a diagrammatic representation of a typical arm structure showing the slide guide and the arm; and FIGURE 4 is a diagrammatic representation of an electrical circuit used for developing the traveling path shown in FIGURE 2.

A longitudinally movable slide 2, of generally conventional structure and motive power, is guided along the fixed support 1. This slide carries an arm 3 which can be raised and lowered in relation to the fixed support. At the end of the arm 3, there is the torch 4 and a skid 5 for maintaining the proper distance between torch and work piece during the cutting process. The slide further carries an adjustably supported feeler rod 6 which is carried along by the slide during forward motion until it touches the side of the billet 7. The feeler rod carries as many adjustable cams as required for the cutting cycle. These cams 8 control the program switches 9 on the slide while the slide is in motion relative to the feeler rod. The program switches in turn control the drives for the slide movements, the various drive speeds, and the opening and closing of the fuel gas and oxygen valves in accordance with a preset program.

Feeler rod 6 is, as indicated diagrammatically in FIGURES 1 and 3 merely carried in supports 6' and 6" sliding when it contacts a billet. With return of the torch arm to starting position, feeler rod 6 is automatically extended to starting position by contact with stop X on the machine. More elaborate resilient telescoping mechanism can be provided.

The work cycle of the automatic program control in relation to the torch movement is shown by FIGURE 2. To start, the torch is at point O, at a distance $a_1$ from the work piece. When the feeler rod 6 touches the work piece 7, the torch reaches point $b$. The first program switch lowers the torch while continuing forward motion so that the torch reaches point $c$ where the downward motion stops because $b$—$c$ is a precisely known distance. The skid 5 touches the upper edge of the workpiece. The next program switch changes from the rapid approach speed to the slower starting cut speed until the torch reaches point $d$ where the speed changes to the cutting speed in accordance with the work piece thickness. The cutting speed is generally higher than the starting cut speed. Upon completion of the cut at point $e$, the torch is lifted and the slide returns at rapid speed. At point $f$, the lifting motion stops and the torch returns to its starting position O.

The device covered by the subject invention is also suitable for controlling the work cycle of the torches of scarfing machines. Since the individual torches of scarfing machines are close together and rigidly connected, only one common feeler rod is necessary for all the torches. Another application exists in transverse cutting of continuous strands. In this case, the device covered by this invention is carried along at a speed synchronous to the strand.

Referring now to FIGURE 3, it should be noted that the slide 2 is substantially conventional and, with variation in detail, will be much the same in machines of different manufacture. The slide consists of a relatively large box-like structure to house the cutting arm mechanism which structure for manipulating the arm is called the slide guide. As could be expected, within the slide guide there is the slide 32 (corresponding to 3 in FIGURE 1) carrying a pair of simple parallel arms 33 and 34 which pivot at their ends 35 and 36 and carry the torch arm 37 at the other ends 38 and 39. Torch 40 is carried at the end of this arm. An air cylinder 41 with one end 42 fixed on the slide and the other fixed to the end of the arm 37 provides the motive power for moving the torch in a vertical path. It may be noted that the path, rather than being a straight line, is slightly arcuate, the radius being the radius determined by the arm itself and the pivots. The end of the arm carries the torch 40 to which are connected gas lines and igniting mechanism, all in conventional style.

The slide is driven by a motor-gear mechanism indicated as 50 and 51. By this means, the slide is given its horizontal motion.

The air cylinder is sometimes replaced with a ring gear and pinion for large structures where a more positive degree of control is sought.

From this general rendition of the structure, it will be seen that the arms carrying the torch execute a sequence of motions, each of which contributes to the end result of severing a billet. In use, the slide 32 operates at a relatively fast speed until the feeler rod 6 engages the billet and its back motion relative to the slide causes the first switch to be tripped to sart the slower movement of the drive motor for cutting the billet. At he same time, the switch controlling the position of the torch arm in an upward stance is tripped and the arm commences slowly to rotate to cutting position, this at a speed to approach the cutting speed of the torch. Lead time is allowed to permit the skid or guide at the torch to contact the billet in cutting position—corresponding to the path c—d in FIGURE 2. When the arm completes its downward turn at c, gases are turned on and ignited; preheat occurs during c—d and the torch increases to cutting speed in the path d—e.

This sequence of switches and relays for these operations is outlined in FIGURE 4 where 60–61 represent power lines, 62, 63, 64, 65, 66 the separate switch mechanisms for each of the movements, and 67, 68, 69, 70, 71 the separate solenoid controls for the switches, each of which would electrically be a part of a low voltage line.

Thus, it will be seen that when the torch completes a pass, it will have severed the billet and the machine will automatically respond to the raising of the solenoid arm and raise the feeler rod and torches to the starting position.

It will be apparent that though the precise movement of the torch has been described in connection with cut-off machines, the same principle of rapid approach of the torch to a work piece, the torch being guided by a feeler rod, can be applied to other heat or flame operations such as those carried out with scarfing machines. Here, the operation is merely that of guiding an array of torches set to move across a work piece at a level close to the surface of the work piece.

Similarly, pre-heating, welding and actually cutting material in a pattern may be carried out using the principle of the machine as described.

Though the invention has been described with reference to only a few examples, it is to be understood that variations in details of construction may be adopted without departing from the spirit or scope of the invention.

What is claimed is:

1. Flame cutting apparatus for transverse cutting of rolled billets employing a driven torch, the torch speed being automatically altered to individual rates of speed fixed in accordance with a pre-selected program, said apparatus comprising a longitudinally movable slide, means to move said slide, a feeler rod carried by one end of said slide and movable in longitudinal relation thereto, a vertically and longitudinally movable arm carried by said slide, means to move said arm, a torch carried by said arm at the end of said slide in fixed relation to said vertically movable arm, said feeler rod being a cam carrier connecting said apparatus to a horizontally arranged programmed mechanism controlling a pre-set program, comprising a plurality of program switches carried by said slide, a series of cams carried by the feeler rod, and means to cause these cams to contact the programming switches causing; (a) the torch to be lowered in an arcuate path; (b) the torch speed to be lowered from a rapid approach speed to a slower starting cut speed; (c) the torch speed to be changed to the cutting speed; (d) lifting of the torch upon completion of the cut and; (e) the torch to be returned at a rapid speed.

2. A flame cutting device in accordance with claim 1, characterized by an adjustable skid attached to the front of the arm for maintaining the correct distance between torch and work piece surface.

3. A device in accordance with claim 1 wherein said feeler rod and torch arm are on a common mount sharing a common drive and the feeler rod is of retractable construction.

References Cited

UNITED STATES PATENTS 2,685,443   8/1954   Rath _____ 266—23

OTHER REFERENCES

Computer Cuts Steps in Flame Profiling, The Iron Age, volume 181, No. 18, May 1, 1958, pages 90–91.

JOHN F. CAMPBELL, *Primary Examiner.*

R. F. DROPKIN, *Examiner.*